United States Patent [19]
Peterson et al.

[11] Patent Number: 6,082,234
[45] Date of Patent: Jul. 4, 2000

[54] ADJUSTABLE TOOLHOLDER

[75] Inventors: John L. Peterson; Carl E. Herbert, both of Nashville; Fred E. Chaffin, Lebanon; John D. Hargis, Cottontown; Mark G. Charleton, Hermitage, all of Tenn.

[73] Assignee: Peterson Tool Company, Nashville, Tenn.

[21] Appl. No.: 09/104,571

[22] Filed: Jun. 25, 1998

[51] Int. Cl.⁷ .............................. B23B 21/00; B23B 1/00
[52] U.S. Cl. .................... 82/1.11; 82/154; 82/158; 82/161; 82/137
[58] Field of Search .................... 82/137, 154, 153, 82/158, 161, 1.5, 12, 86, 100, 1.11; 407/81, 82, 83, 87, 88, 89, 95, 96; 409/182, 190, 201, 202, 204, 205, 211

[56] References Cited

U.S. PATENT DOCUMENTS

| | | | |
|---|---|---|---|
| 972,582 | 10/1910 | Smith | 82/161 |
| 1,158,753 | 11/1915 | Waite | 82/137 |
| 2,903,781 | 9/1959 | Hudson | 29/96 |
| 3,160,038 | 12/1964 | Wood | 82/137 X |
| 3,546,759 | 12/1970 | Sirola | 29/98 |
| 3,566,723 | 3/1971 | Oborne | 82/36 |
| 4,080,854 | 3/1978 | Peterson | 82/36 |
| 4,389,144 | 6/1983 | Sipos | 407/82 |
| 4,417,489 | 11/1983 | Liu | 82/158 X |
| 4,422,356 | 12/1983 | Pertle | 82/36 |
| 4,520,701 | 6/1985 | Watamura | 82/161 X |
| 4,631,994 | 12/1986 | Jester et al. | 82/36 |
| 4,750,392 | 6/1988 | Hong | 82/36 |
| 4,840,095 | 6/1989 | Nussbaumer et al. | 82/137 X |
| 4,879,930 | 11/1989 | Von Haas | 82/153 |
| 5,417,130 | 5/1995 | Dorsch | 82/12 X |

FOREIGN PATENT DOCUMENTS

| | | | |
|---|---|---|---|
| 1004696 | 4/1952 | France | 82/161 |

OTHER PUBLICATIONS

U.S. Application No. 09/016,472, Peterson et al., filed Jan. 30, 1998.
Exhibit A—Drawing of a clamp rod and dovetail type carrier block (the contents of which are admitted to be prior art).
Exhibit B—Kennametal brochure (undated but admitted to be prior art).
Exhibit C—Valenite brochure (undated but admitted to be prior art).

Primary Examiner—Henry W. H. Tsai
Attorney, Agent, or Firm—Waddey & Patterson; Lucian Wayne Beavers

[57] ABSTRACT

An adjustable toolholder apparatus includes a base plate having a planar supporting surface. A holder body includes a bottom planar supported surface which slideably engages and rests upon the supporting surface of the base plate. A linear position adjuster provides a linear sliding motion of the holder body upon the base plate. An angular position adjuster provides a rotational sliding motion of the holder body upon the base plate. The holder body has a wedge shaped recess within which is received a wedge shaped carrier block. A vertically adjustable column supports the wedge shaped carrier block from the base plate to adjust a height of the cutting tool. After linear and angular adjustment of the cutting tool relative to the base plate, the wedge shaped carrier block is clamped to the holder body, and the holder body and base plate are clamped to a cross slide to fix the cutting tool in its final desired position.

30 Claims, 3 Drawing Sheets

ADJUSTABLE TOOLHOLDER

BACKGROUND OF THE INVENTION

1. Field of the Invention

The present invention relates generally to toolholders for holding cutting tools used with multi-spindle machines, and more particularly, but not by way of limitation, to an adjustable toolholder designed for use with form tools.

2. Description of the Prior Art

A multi-spindle machine includes a plurality of rotating spindles. A workpiece is mounted in each spindle. The workpiece is rotated by the spindle, and is engaged by a variety of cutting tools to shape the rotating workpiece into a final part.

The various cutting tools are mounted in very rugged holding devices which are bolted to a supporting surface of a cross slide of the machine.

As each spindle of the multi-spindle machine is indexed to the various operating positions of the machine, the cross slide associated with that respective position is advanced toward the rotating workpiece to engage a cutting tool with the rotating workpiece.

As will be appreciated by those skilled in the art, the adjustment of the position of the cutting tool relative to the rotating workpiece is critical to achieving the desired finished cut on the workpiece. Because the cross slide advances to a predetermined position relative to the spindle, this adjustment must be made by first adjusting the position of the cutting tool relative the cross slide upon which it is mounted.

Traditionally, this adjustment has been accomplishment by adjustment of the position of the toolholder upon the cross slide. This is accomplished by using hammers to bump the toolholder to a desired position, and using shims under the toolholder. Through a process of trial and error, the toolholder is bumped toward an appropriate position and/or shimmed to a desired height and finally clamped in position on the cross slide. It will be appreciated that this is a tedious, inefficient and imprecise technique.

Thus, there is a need in the art for a more easily and precisely adjustable positioning of a cutting tool relative to the cross slide upon which it is mounted.

For example, U.S. Pat. No. 3,566,723 to Oborne discloses a cutting toolholder for positioning a cutting tool against a workpiece. The holder includes facilities for adjustment of the tool so that it may be raised or lowered, and moved laterally, longitudinally and angularly with respect to the workpiece.

Although the Oborne device achieves to some degree some of the results to which the present invention is directed, it will be appreciated that in many aspects the present invention is vastly improved relative to the Oborne structure. This is particularly true with regard to the means for angular adjustment provided by the present invention, and with regards to the carrier block construction, clamping and adjustment means of the present invention for adjusting the height of the cutting tool.

U.S. Pat. No. 4,631,994 to Jester, et al., discloses another construction for an adjustable holder for a cutting tool which allows both linear and angular adjustment.

U.S. Pat. No. 4,750,392 to Hong, provides a hollow housing having an extendible body to provide fore and aft movement, and having a rotatable tool holding head mounted upon the body to provide angular movement.

Other prior art references located in a preliminary patentability search directed to the present invention include the following:

U.S. Pat. No. 4,879,930 to Von Haas
U.S. Pat. No. 4,422,356 to Pertle
U.S. Pat. No. 4,389,144 to Sipos
U.S. Pat. No. 4,080,854 to Peterson
U.S. Pat. No. 3,546,759 to Sirola
U.S. Pat. No. 2,903,781 to Hudson Thus, it is seen that there is a need in the art for an improved adjustable toolholder apparatus which allows the position of a cutting tool to be adjusted linearly, angularly, and in height.

SUMMARY OF THE INVENTION

An adjustable toolholder apparatus is provided for holding a cutting tool, particularly to be used with a multi-spindle machine. The toolholder apparatus includes a base or base plate having a planar supporting surface. A holder body includes a bottom supported surface which slideably engages and rests upon the top of the supporting surface of the base. A linear position adjuster causes the holder body to slide in a linear direction upon the base. An angular position adjuster adjusts an angular orientation of the holder body upon the base by causing a rotating sliding motion of the holder body upon the base.

The linear position adjustment is provided by a drawbar which is received in a linear groove defined in the planar supporting surface of the base. The drawbar is pivotably connected to the holder body so that the drawbar and the holder body move linearly together relative to the base.

A slider block is slideably received in a transverse groove defined in the bottom planar supported surface of the holder body. The slider block has a notch which fits about the drawbar to connect the slider block to the drawbar.

Rotation of a first micrometer screw adjusts the position of the drawbar to adjust the linear position of the holder body. Rotation of a second micrometer screw connected to the slider block causes the holder body to rotate or pivot relative to the base plate to change the angular position of the cutting tool.

A wedge shaped carrier block is received in a complementary wedge shaped recess defined in the holder body. The carrier block is clamped to the holder body by pulling the wedge shaped carrier block into tight engagement with the inwardly tapered walls of the wedge shaped recess of the holder body.

The carrier block is directly supported from the base plate by an adjustable height supporting column. The height of the carrier block and the cutting tool relative to the base plate is adjusted by rotation of a threaded member of the supporting column.

Methods of adjusting a cutting tool engagement with a rotating workpiece using the apparatus just described are also disclosed.

It is therefore an object of the present invention to provide improved apparatus and methods for adjusting a cutting tool engagement with a rotating workpiece on a multi-spindle machine.

Another object of the present invention is the provision of an adjustable toolholder having a holder body which is linearly and rotatably, slideably supported by direct engagement with a supporting surface of a base plate.

Yet another object of the present invention is the provision of an adjustable toolholder apparatus wherein an angular adjustment of the cutting tool is provided by a transverse slider block which fits over and is thus connected to a drawbar, the slider block having a notch with a throat portion in close contact fit with the drawbar, and the notch flaring outward in each direction from the throat portion to allow some pivotal motion of the slider block relative to the drawbar.

Still another object of the present invention is the provision of an improved height adjustment for a carrier block wherein an adjustable height supporting column supports the carrier block directly from the base plate.

Another object of the present invention is the provision of a wedge shaped carrier block which is clamped to the holder body by pulling the wedge shaped carrier block into tight engagement with the complementary tampered side walls of a wedge shaped recess of the holder body.

Still another object of the present invention is the provision of improved methods of adjusting cutting tool engagement with a rotating workpiece.

Numerous other objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
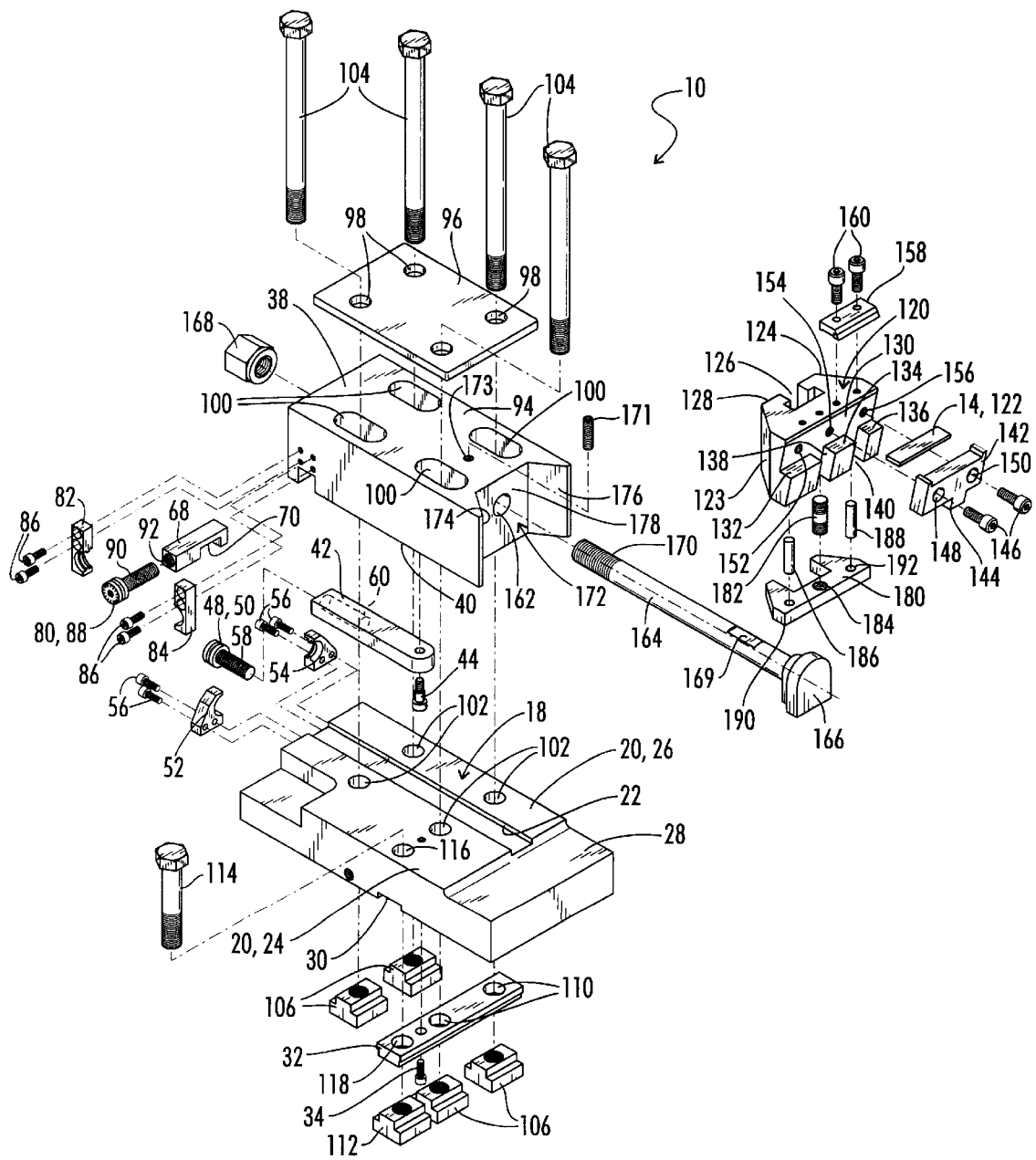
FIG. 1 is an exploded view of the adjustable toolholder apparatus.
Figure 2:
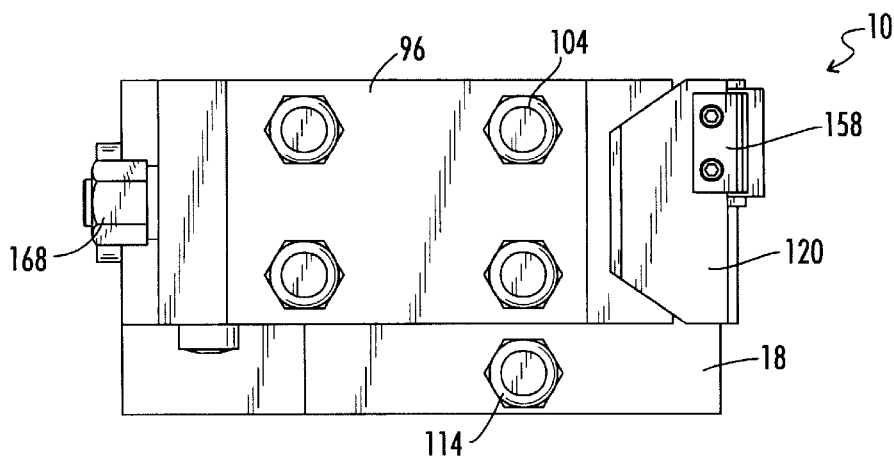
FIG. 2 is a top plan view of the assembled toolholder apparatus of FIG. 1.

Turning now to the drawings, and particularly to FIG. 1, the adjustable toolholder apparatus of the present invention is shown and generally designated by the numeral 10. As is schematically illustrated in FIG. 2, the toolholder apparatus 10 is constructed to be mounted upon a cross slide 12 of a multi-spindle machine. The cross slide 12 moves the toolholder 10 and a cutting tool 14 carried thereby, into and out of engagement with a rotating workpiece 16.

The apparatus 10 includes a base or base plate 18. The base plate 18 includes a planar top supporting surface 20. A linear groove 22 is defined in the surface 20 and divides the surface 20 into first and second supporting surface portions 24 and 26, respectively.

The base plate 18 includes a forward portion having a top surface 28 thereon, which as further described below provides a positive stop for supporting a carrier block.

Base plate 18 has a groove 30 defined in its lower surface. A key 32 is received in the groove and is attached to the base plate 18 by a retaining screw 34. The key 32 is received in a slot 36 of the cross slide 12 in a conventional manner.

Figure 5:
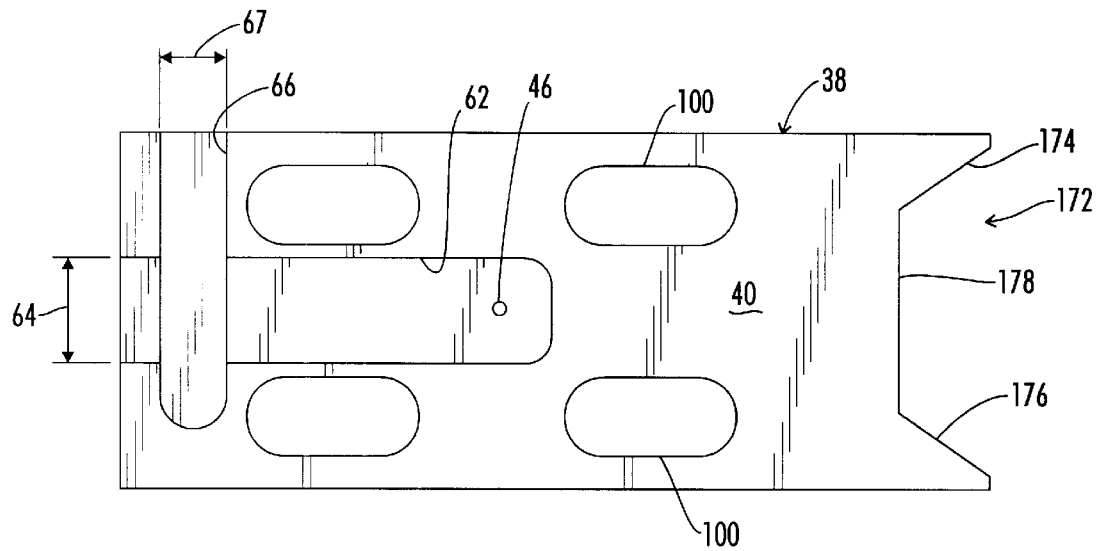
FIG. 5 is a bottom view of the holder body illustrating the longitudinal and transverse slots defined in the bottom supported planar surface of the holder body.
Figure 6:
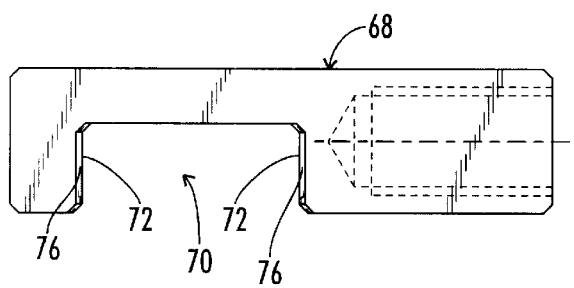
FIG. 6 is a side elevation view of the slider block.
Figure 8:
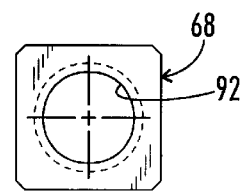
FIG. 8 is a right end view of the slider block of FIG. 6.

Apparatus 10 further includes a holder body 38. The holder body 38 includes a bottom supported surface 40 which is best seen in FIG. 5 which is a bottom view of the holder block 38. The bottom supported surface 40 slideably engages and rests on the top of the supporting surface 20 of base plate 18.

A drawbar 42 is slideably received in the groove 22 of base plate 18. A pivot pin 44 pivotally connects the drawbar 42 to the holder body 38. Pivot pin 44 has a threaded upper portion which threadedly engages a small threaded bore 46 defined in the holder body 38 as seen in FIG. 5. The pivot pin 44 may be generally described as a connector 44 attaching the drawbar 42 to the holder body 38 so that the drawbar and holder body move together linearly relative to the base plate 18.

A first micrometer adjustment screw 48 has its head 50 rotatably attached to base plate 18 by a pair of attachment plate halves 52 and 54 which are attached to base plate 18 by screws 56. The first micrometer screw 48 has a threaded shaft 58 which is threadedly received in a bore 60 defined in the end of drawbar 42.

Thus, when the first micrometer screw 48 is rotated, the threaded engagement thereof with the drawbar 42 causes the drawbar 42 to slide linearly back and forth within the linear groove 22. This also causes the holder body 38 to slide upon the base plate 18 back and forth in a direction parallel to the length of groove 22. This motion causes the cutting tool 14 to be moved closer to or further away from the workpiece 16 to adjust the diameter of the resulting workpiece 16.

The first micrometer screw 48 may be generally referred to as a drawbar position adjuster 48 for moving the drawbar 42 in the groove 22. The first micrometer screw 48, drawbar 42, and groove 22 may be collectively referred to as a linear position adjuster means for adjustably moving the holder body 38 in a linear direction upon the base plate 18. This provides means for adjusting a diameter of the workpiece 16 formed by the cutting tool 14.

As best seen in FIG. 5 which is a bottom view of holder body 38, the holder body 38 has a downwardly open linear groove 62 defined in the supported surface 40. The drawbar 42, which has a thickness greater than the depth of groove 62 in holder body 38, thus is partially received in the groove 22 of the base plate 18. It is noted that the groove 62 has a width 64 significantly greater than the width of drawbar 42 to allow some lateral movement of drawbar 42 within the groove 62. For example, the width 64 may be 1.0 inches for a drawbar 42 having a width of 0.75 inches, thus allowing a 0.125 inch clearance on each side of the drawbar 42 when it is centered within the groove 62. Similarly, the transverse groove 66 is wider than the slider block 68. For example, the transverse groove 66 may have a width 67 of 0.62 inches for a slider block 68 having a width of 0.50 inches.

Holder body 38 also has a downwardly open transverse groove 66 defined therein. The transverse groove 66 intersects the linear groove 62.

Figure 7:
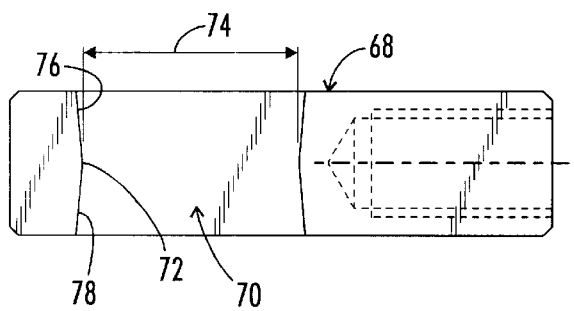
FIG. 7 is a bottom view of the slider block of FIG. 6 showing the notch having a throat portion and outwardly flared portions.

A slider block 68 is slideably received in the transverse groove 66. Slider block 68 has a notch 70 defined therein which fits over the drawbar 42 to connect the slider block 68 to the drawbar 42. As best seen in FIG. 7, the notch 70 has a throat portion 72 having a width 74 which provides a close contact fit when the notch 70 is placed over the drawbar 42. The notch flares outwardly in flared areas 76 and 78 extending in each direction from the throat portion 72. As is further described below, this allows some pivotal movement of the slider block 68 relative to the drawbar 42.

A second micrometer adjustment screw 80 is attached to the holder block 38 by first and second attachment plates halves 82 and 84. The halves 82 and 84 are attached to holder block 38 with a plurality of machine screws 86. The head 88 of second micrometer 80 is rotatably held between the mounting plate halves 82 and 84. A threaded portion 90 of micrometer screw 80 is threadedly received in a threaded bore 92 of slider block 68.

The second micrometer screw 80, slider block 68, notch 70, drawbar 42 and the associated grooves 62 and 66 provide an angular position adjuster means for adjusting a taper of the workpiece 16 being formed by the cutting tool 14. This may also be described as an angular position adjuster means for adjusting an angular orientation of the holder body 38 upon the base plate 18. This is accomplished in the following manner. It will be recalled that the holder body 38 is pivotably connected to drawbar 42 by the pivot pin 44 which allows the holder body 38 to rotate about the pivot pin 44 relative to the drawbar 42 and in the plane of the planar supporting surface 20 of base plate 18.

When it is desired to make this angular adjustment, the second micrometer screw 80 is rotated. This translates this slider block 68 backwards or forwards in the transverse groove 66. The tight fit connection of throat portion 72 of notch 70 of slider block 68 with the drawbar 42 causes the rear portion of holder body 38 to slide transversely upon supporting surface 20 so that the holder block 38 rotates upon the base plate 18 about the pivot pin 44. This rotational motion is permitted by the fact that the grooves 62 and 66 are wider than the drawbar 42 and slider block 68, respectively, and by the fact that the notch 70 with its flared portions 76 and 78 allow some angular movement between the slider block 68 and drawbar 42 at the tight fit connection therebetween.

Thus, the angular adjustment provided by second micrometer screw 80 provides a means for adjusting a taper of the finished workpiece 16.

The angular position adjuster system just described is designed to allow a maximum angular movement from one extreme to the other of the holder body 38 about pivot pin 44 in the range of about 4°.

The holder body 38 has a planar top surface 94 defined thereon. A washer plate 96 slideably engages the top surface 94. Four aligned bolt holes are defined through the washer plate 96, holder body 38 and base plate 18. The bolt holes in washer plate 96 are indicated by the numeral 98. The bolt holes through holder body 38 are elongated bolt holes 100 to accommodate the sliding and pivotal movement of the holder body 38 relative to the base plate 18. The bolt holes through base plate 18 are designated by numeral 102.

Four bolts 104 extend downwardly through the bolt holes 98, 100 and 102 and threadedly engage a plurality of T-nuts 106, which are adapted to be received in the inverted T-shape grooves 108 (see FIG. 3) of cross slide 12.

It is noted that the forward most two of the bolts 104 also extend through bolt holes 110 defined in the key 32.

A fifth T-nut 112 is directly attached to base plate 18 by a bolt 114 extending through bolt holes 116 in base plate 18 and 118 in key 32.

It will be appreciated that during the linear and angular adjustment of position of holder body 38 upon the base plate 18, the bolts 104 will not be tightly fastened. Once the holder body 38 has been finally positioned relative to base plate 18, the bolts 104 are tightened to clamp the apparatus 10 in place upon the cross slide 12. This also clamps the holder body 38 in place relative to the base plate 18 and no further adjustment of first and second micrometer screws 48 and 80 is possible unless the bolts 104 are loosened.

The apparatus 10 further includes a means for adjusting the height of the cutting tool 14 relative to base plate 18, which will now be described.

A wedge shaped carrier block 120 is provided for carrying the cutting tool insert 122 which defines the cutting tool 14. The carrier block 120 has first and second tapered sides 123 and 124 which define the wedge shape. Carrier block 120 has a partially closed channel 126 defined in the rear face 128 thereof.

Carrier block 120 has a flat forward surface 130 having first, second and third ledges 132, 134, and 136 defined thereon with gaps 138 and 140 separating the ledges.

A removable, replaceable anvil 142 is constructed to rest upon two of the ledges 132, 134 and 136, with its key 144 fitting in either the gap 138 or the gap 140.

It will be noted that two machine screws 146 fit through two screw holes 148 and 150 of anvil 142, and may be threadedly received within a selected pair of screw holes 152, 154 and 156 defined in the forward face 130 of carrier block 120. Thus, the anvil 142 and cutting tool insert 122 may be located in one of two selected positions which provides greater flexibility for the set up of the cutting tool 14. Furthermore, if the anvil 142 is damaged during use, the anvil can be replaced without replacing the entire carrier block 120.

The cutting tool insert 122 is held in place upon anvil 142 by a clamp plate 158 which is held in place upon carrier block 120 by a plurality of machine screws 160.

The holder body 38 has a bore 162 defined therethrough. A clamp rod 164 is received through the bore 162. The clamp rod 164 has a key 166 which may also be described as an enlarged member 166 defined on the forward end thereof The key 166 is slideably received within the partially opened channel 126 and the carrier block 120 may slide up and down relative to the key 166. A threaded clamp nut 168 engages a threaded second end 170 of clamp rod 164 which extends out the other end of bore 162. Clamp nut 168 may be tightened to draw the wedge shaped carrier block 120 into clamping engagement with holder body 38 in the following manner.

It is noted that the holder body 38 has a wedge shaped recess 172, which may also be generally described as a concave opening 172, defined in the forward end thereof. The wedge shaped recess 172 is defined by first and second inwardly tapering walls 174 and 176, and is complementary to the wedge shape of carrier block 120.

The inwardly tapering walls 174 and 176 of holder body 38 are tapered at an angle substantially equal to the angle of taper of tapered sides 123 and 124 of the wedge shaped carrier block 120. The recess 172 and carrier block 120 are dimensioned such that when the clamp rod 164 is tightened to pull the carrier block 120 into the recess 172, the rearward surface 128 of carrier block 120 does not engage a forward planar surface 178 of holder body 138, and thus, it is the tapered sides 123 and 124 which are pulled into tight engagement with the tapered walls 174 and 176, respectively, to clamp the carrier block 120 into engagement with the holder body 38.

The tapered sides 123 and 124 of wedge shaped carrier block 120, and the tapered walls 174 and 176 of holder body 138, are preferably oriented at angles to the length of clamp rod 164 in a range of about 35° to 45°.

The clamp rod 164 has a flat 169 defined thereon. A threaded limit pin 171 is received through threaded bore 173 defined in the top surface of holder body 38 and communicated with the bore 162. The limit pin 171 extends downward into the space above flat 169 and serves simply to prevent the clamp rod 164 from sliding out of the bore 162. The limit pin 171 does not tightly engage the flat 169.

The clamp rod 164 is free to slide within the bore 162 within the limits permitted by the abutment of limit pin 171 with either end of the flat 169.

Prior to clamping the carrier block 120 to holder body 38, it is desirable to adjust the vertical height of the carrier block 120 relative to the base plate 18. That is accomplished in the following manner.

A support plate 180 is connected to carrier block 120 by a support column 182 which is threaded on each end. The upper threaded end of support column 182 threadedly engages a threaded bore in carrier block 120, and the lower threaded end of support column 182 threadedly engages a threaded bore 184 of support plate 180.

A pair of alignment pins 186 and 188 are received in pin bores 190 and 192 of support plate 180 and in similar pin bores (not shown) located in the lower surface of carrier block 120.

Thus, to adjust the height of carrier block 120 relative to base plate 18, the threaded supporting column 182 is rotated to adjust its threaded engagement with support plate 180 and carrier block 120 to move them either closer or further apart. Support column 182 may be rotated by a wrench, screw driver or other means. Thus, the combination of the support column 182 and support plate 180 may be described as an adjustable height supporting column which engages and rests upon the base plate 18 and supports the carrier block 120 and the cutting tool insert 122 at an adjustable height above the base plate 18.

The partially opened channel 126 extends vertically, which may be described as a direction generally parallel to the vertically extending tapered sides 123 and 24 which slide vertically against the vertically oriented tapered side walls 174 and 176 of holder body 38, so that the carrier block 120 can slide relative to the holder body 38 to adjust the height of the carrier block 120.

METHODS

The apparatus 10 just described can be used in the following manner to provide methods of adjusting the engagement of the cutting tool 14 with the rotating workpiece 16.

First, the cutting tool insert 122 is mounted upon the holder body 38 by means of the carrier block 120 and the clamp plate 158 and anvil 142. The holder body 38 has its lower planar surface 40 slideably engaging the top supporting surface of base plate 18.

Figure 3:
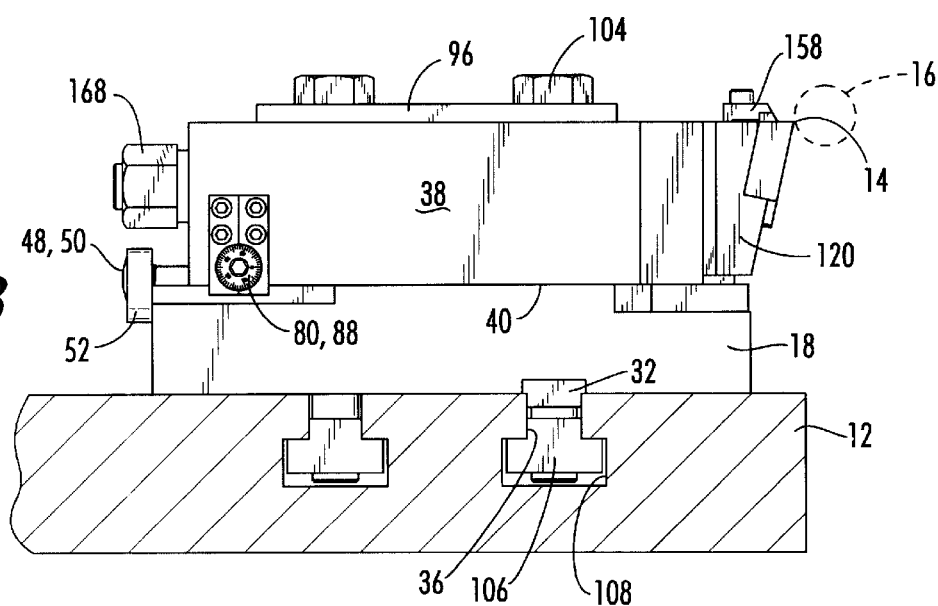
FIG. 3 is a side elevation view of the apparatus of FIG. 2.
Figure 4:
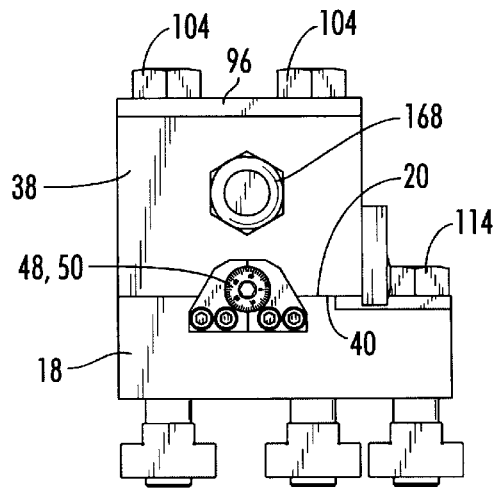
FIG. 4 is a left end elevation view of the apparatus of FIG. 2.

The base plate 18 is supported upon the cross slide 12 as seen in FIG. 3.

To adjust the diameter of the workpiece 16, the apparatus 10 slides the bottom surface 40 of the holder body 38 on the top supporting surface 20 of base plate 18 toward or away from the workpiece 16.

This is accomplished by rotating the first micrometer adjustment screw 48 which has a length parallel to the direction in which the holder body 38 slides, which direction is parallel to the length of linear groove 22. This rotation of micrometer screw 48 slides the drawbar 42 in the linear groove 22 defined in the supporting surface 20 of base plate 18.

To adjust the taper of the workpiece 16, the apparatus 10 pivots the holder body 38 on the top supporting surface 20 of the base plate 18 thus providing a rotational sliding motion of the bottom planar surface 40 of holder body 38 upon the supporting surface 20 of base plate 18.

This is accomplished by rotating the second micrometer screw 80 thereby sliding the slider block relative to holder body 38 in a direction transverse to the direction in which the drawbar 42 slides.

After the linear and angular adjustment of the holder body 38 and cutting tool 122 relative to the base plate 18, the holder body 38 is clamped in place in position relative to the base plate 18 and to the cross slide 12 by tightening the bolts 104 which clamp the apparatus 10 to the cross slide 12.

The carrier block 120 and cutting tool insert 122 are supported directly upon the base plate 18 by the support plate 180 and supporting column 182.

The height at which the cutting tool insert 122 engages the rotating workpiece 16 may then be adjusted by rotating the threaded supporting column 182. When the height has been adjusted to its desired position, the carrier block 120 is tightly clamped to the holder body 38 by tightening the nut 168 on clamp rod 164.

Although the apparatus 10 may be used to hold any type of cutting tool insert, it is primarily designed as a form toolholder. As will be appreciated by those skilled in the art, a form tool is the first tool used to cut upon the rotating workpiece to remove major portions of material therefrom. After the workpiece has been formed close to is final shape, the final machining operations are performed with a shave tool which does much more precise finishing. The apparatus 10 could, however, also be used to hold a shave tool. The rugged construction of the apparatus 10, however, is particularly adapted for holding a form tool which must be supported against much greater cutting forces than is a shave tool.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. An adjustable toolholder apparatus for holding a tool, comprising:

a base including a planar supporting surface;

a holder body including a supported surface which slidably engages and rests on top of the supporting surface of the base;

a linear position adjuster means for adjustably moving the holder body in a linear direction upon the base; an angular position adjuster means for adjusting an angular orientation of the holder body upon the base;

wherein the linear position adjuster means is a means for adjusting a diameter of a workpiece formed by the tool; and wherein the angular position adjuster means is a means for adjusting a taper of the workpiece formed by the tool along a longitudinal axis of the workpiece.

2. The apparatus of claim 1, further comprising:

a carrier block for carrying the tool; and a clamp connecting the carrier block to the holder body.

3. The apparatus of claim 2, further comprising:

an adjustable height supporting column which engages and rests upon the base and supports the carrier block and the tool at an adjustable height above the base.

4. The apparatus of claim 2, wherein:

the holder body has a concave opening defined therein by first and second inwardly tapering walls;

the carrier block is wedge shaped and has first and second tapered sides engaging the first and second walls, respectively, of the holder body; and the clamp is arranged to force the tapered sides of the carrier block into tight engagement with the tapered walls of the holder body.

5. The apparatus of claim 4, wherein;

the holder body has a bore therethrough;

the carrier block has a partially closed channel defined therein; and the clamp includes a clamp rod received through the bore of the holder body, the clamp rod having a key defined on one end thereof, the key being slideably received in the channel.

6. An adjustable toolholder apparatus for holding a tool, comprising:

a base including a planar supporting surface;

a holder body including a supported surface which slidably engages and rests on top of the supporting surface of the base, the holder body further including a planar top surface defined thereon;

a linear position adjuster means for adjustably moving the holder body in a linear direction upon the base;

an angular position adjuster means for adjusting an angular orientation of the holder body upon the base;

a washer plate slidably engaging the planar top surface of the holder body;

the base, the holder body and the washer plate having a plurality of aligned bolt holes defined therethrough;

a plurality of T-nuts adapted to be received in T-grooves of a cross-slide; and a plurality of bolts extending through the plurality of bolt holes and engaging the T-nuts for clamping the apparatus to the cross slide.

7. The apparatus of claim 6, wherein;

the holder body has a downwardly open groove defined in the supported surface; and the drawbar is partially received in the downwardly open groove of the holder body.

8. The apparatus of claim 6, wherein;

the connector is a pivot which allows the holder body to rotate about the pivot relative to the drawbar and in the plane of the planar supporting surface.

9. The apparatus of claim 6, wherein the angular position adjuster means comprises:

a transverse groove defined in the planar supported surface of the holder body;

a slider received in the transverse groove, the slider being connected to the drawbar; and a slider position adjuster for moving the slider in the transverse groove relative to the holder body and thereby pivoting the holder body relative to the base.

10. The apparatus of claim 9, wherein:

the slider has a notch defined therein which fits over the drawbar to connect the slider to the drawbar, the notch having a throat position which is in close contact fit with the drawbar and the notch flaring outward in each direction from the throat position to allow some pivotal movement of the slider relative to the drawbar.

11. The apparatus of claim 6, wherein:

the bolt holes through the holder body are elongated slots to accommodate the sliding and pivotal movement of the holder body relative to the base.

12. An adjustable toolholder apparatus for holding a tool, comprising:

a base including a planar supporting surface;

a holder body including a supported surface which slidably engages and rests on top of the supporting surface of the base;

a linear position adjuster means for adjustably moving the holder body in a linear direction upon the base, the linear position adjuster means including:

a linear groove defined in the planar supporting surface of the base and separating the planar supporting surface into first and second planar supporting surface portions on opposite sides of the linear groove, the supported surface of the holder body slidably engaging and resting on top of both of the first and second planar supporting surface portions;

a drawbar slidably engaged in the groove;

a connector attaching the drawbar to the holder body so that the drawbar and holder body move together linearly relative to the base; and a drawbar position adjuster for moving the drawbar in the groove; and an angular position adjuster means for adjusting an angular orientation of the holder body upon the base.

13. An adjustable toolholder apparatus, comprising:

a base plate having a planar supporting surface defined thereon and having a first groove defined in the planar supporting surface;

a drawbar slideably received in the first groove;

a first threaded adjustment screw connecting the drawbar to the base plate so that rotation of the screw slides the drawbar within the first groove;

a holder body having a planar supported surface slideably resting upon the planar supporting surface of the base plate, and having a second groove defined in the planar supported surface, the second groove being transverse to the first groove;

a pivot pin connecting the holder body to the drawbar so that the holder body and drawbar slide together relative to the base plate upon adjustment of the first threaded adjustment screw;

a slider block slideably received in the second groove; and a second threaded adjustment screw connecting the slider block to the holder body so that rotation of the second threaded adjustment screw pivots the holder body about the pivot pin relative to the base plate.

14. The apparatus of claim 13, wherein:

the slider block has a notch defined therein which fits over the drawbar to connect the slider block to the drawbar, the notch having a throat position which is in close contact fit with the drawbar and the notch flaring outward in each direction from the throat position to allow some pivotal movement of the slider block relative to the drawbar.

15. The apparatus of claim 13, wherein the holder body has a planar top surface defined thereon; and the apparatus further includes a washer plate slideably engaging the planar top surface of the holder body;

the base plate, the holder body and the washer plate having a plurality of aligned bolt holes defined therethrough;

a plurality of T-nuts adapted to be received in T-grooves of a cross slide; and a plurality of bolts extending through the plurality of bolt holes and engaging the T-nuts for clamping the apparatus to the cross slide.

16. The apparatus of claim 15, wherein:

the bolt holes through the holder body are elongated slots to accommodate the sliding and pivotal movement of the holder body relative to the base plate.

17. The apparatus of claim 13, further comprising:

a tool clamp carried by the holder body, for clamping a cutting tool to the apparatus to cut a rotating workpiece;

wherein adjustment of the first threaded adjustment screw adjusts a diameter of the workpiece; and wherein adjustment of the second threaded adjustment screw adjusts a taper of the workpiece along a longitudinal axis of the workpiece.

18. The apparatus of claim 13, further comprising:

a carrier block; and a clamp connecting the carrier block to the holder body.

19. The apparatus of claim 18, further comprising;

an adjustable height supporting column which engages and rests upon the base plate and supports the carrier block at an adjustable height above the base plate.

20. A toolholder apparatus, comprising:

a holder body having a concave opening therein defined by first and second inwardly tapering walls, and having a bore defined through the holder body and communicated with the concave opening;

a wedge shaped carrier block received in the concave opening and having first and second tapered sides engaging the first and second walls, respectively, of the holder body, the carrier block having a partially closed channel defined therein;

a clamp rod received through the bore of the holder body and having a first end with an enlarged member defined thereon, the enlarged member being received in the partially closed channel of the carrier block, the clamp rod having a second end extending out of the bore on the opposite side of the holder body from the concave opening; and tightening means, engaging the second end of the clamp rod, for pulling the first end of the clamp rod and the carrier block toward the holder body so that the first and second tapered sides of the carrier block tightly engage the inwardly tapering walls of the holder body to clamp the carrier block against the holder body.

21. The apparatus of claim 20, wherein the tightening means is a threaded nut.

22. The apparatus of claim 20, wherein the enlarged member of the clamp rod is slideably received in the partially closed channel of the carrier block, and the channel extends in a direction parallel to the first and second tapered sides of the carrier block so that the carrier block can slide relative to the holder body to adjust a height of the carrier block.

23. The apparatus of claim 22, further comprising:

a base supporting the carrier block;

an adjustable height support means resting on the base and connected to the carrier block, for adjusting the height of the carrier block relative to the holder body.

24. A method of adjusting a cutting tool engagement with a rotating workpiece, comprising:

(a) mounting the cutting tool on a holder body having a bottom planar surface;

(b) slideably engaging the bottom planar surface of the holder body on a top supporting surface of a base plate;

(c) supporting the base plate on a cross slide;

(d) sliding the bottom planar surface of the holder body on the top supporting surface of the base plate toward or away from the workpiece to adjust a diameter of the workpiece; and (e) pivoting the holder body on the base plate to adjust a taper of the workpiece along a longitudinal axis of the workpiece, the pivoting including rotational sliding motion of the bottom planar surface of the holder body on the top supporting surface of the base plate.

25. The method of claim 24, further comprising;

after steps (d) and (e), clamping the holder body and base plate in position relative to each other and relative to the cross slide.

26. The method of claim 24, wherein step (d) includes rotating a first threaded adjustment screw having a length parallel to a direction in which the holder body slides, and thereby sliding a drawbar in a groove in the supporting surface of the base plate.

27. The method of claim 26, wherein;

step (e) includes rotating a second threaded adjustment screw and thereby sliding a slider block in a direction transverse to the direction in which the drawbar slides, the slider block being connected to the drawbar.

28. The method of claim 24, wherein:

step (a) includes attaching the cutting tool to a carrier block; and the method further including supporting the carrier block with a supporting column resting directly upon the base plate; and adjusting a height of the supporting column and the carrier block and the cutting tool relative to the base plate to adjust a height at which the cutting tool engages the workpiece.

29. The method of claim 28, wherein:

the carrier block is wedge shaped having inwardly tapered sides, and the holder body has a complementary wedge shaped recess defined therein, the recess having inwardly tapered walls; and step (a) further includes clamping the carrier block to the holder body by pulling the inwardly tapered sides of the carrier block into tight engagement with the inwardly tapered walls of the recess of the holder body.

30. The method of claim 24, wherein;

step (a) includes attaching the cutting tool to a carrier block, the carrier block being wedge shaped having inwardly tapered sides, and the holder body having a complementary wedge shaped recess defined therein, the recess having inwardly tapered walls; and the method further including clamping the carrier block to the holder body by pulling the inwardly tapered sides of the carrier block into tight engagement with the inwardly tapered walls of the recess of the holder body.

* * * * *

UNITED STATES PATENT AND TRADEMARK OFFICE
CERTIFICATE OF CORRECTION

PATENT NO. : 6,082,234
DATED : July 4, 2000
INVENTOR(S) : Peterson, et. al.

It is certified that error appears in the above-indentified patent and that said Letters Patent is hereby corrected as shown below:

Column 9, line 38 (claim 7, first line), delete "6" and insert --12--, therefor.

Column 9, line 43 (claim 8, first line), delete "6" and insert --12--, therefor.

Column 9, line 47 (claim 9, first line), delete "6" and insert --12--, therefor.

Signed and Sealed this

Tenth Day of April, 2001

NICHOLAS P. GODICI

*Attest:*

*Attesting Officer*    *Acting Director of the United States Patent and Trademark Office*